(12) United States Patent
Berry et al.

(10) Patent No.: US 8,112,457 B2
(45) Date of Patent: Feb. 7, 2012

(54) SYSTEM AND METHOD FOR DYNAMICALLY BUILDING A WEB INTERFACE PER DATA COLLECTING RULES

(75) Inventors: Charles Franklin Berry, Apalachin, NY (US); Glenn C. Godoy, Endwell, NY (US); Amy Jeanne Snavely, Binghamton, NY (US)

(73) Assignee: International Business Mahines Corporation, Armonk, NY (US)

( * ) Notice: Subject to any disclaimer, the term of this patent is extended or adjusted under 35 U.S.C. 154(b) by 381 days.

(21) Appl. No.: 12/350,435

(22) Filed: Jan. 8, 2009

(65) Prior Publication Data

US 2010/0174995 A1 Jul. 8, 2010

(51) Int. Cl.
*G06F 17/30* (2006.01)
(52) U.S. Cl. .................................. 707/805; 715/762
(58) Field of Classification Search .................. 715/762
See application file for complete search history.

(56) References Cited

U.S. PATENT DOCUMENTS

| | | | |
|---|---|---|---|
| 6,278,448 B1 | 8/2001 | Brown et al. | |
| 6,546,397 B1 | 4/2003 | Rempell | |
| 6,915,486 B2 | 7/2005 | Li et al. | |
| 7,275,041 B1 | 9/2007 | Cue et al. | |
| 7,765,464 B2 * | 7/2010 | Bokor | 715/204 |
| 2006/0242266 A1* | 10/2006 | Keezer et al. | 709/218 |
| 2007/0050753 A1* | 3/2007 | Holt et al. | 717/114 |
| 2009/0125526 A1* | 5/2009 | Neufeld | 707/10 |
| 2010/0095197 A1* | 4/2010 | Klevenz et al. | 715/234 |

* cited by examiner

*Primary Examiner* — Khanh Pham
*Assistant Examiner* — Alexander Khong
(74) *Attorney, Agent, or Firm* — Schmeiser, Olsen & Watts;; John R. Pivnichny

(57) ABSTRACT

A system and associated method for dynamically building a web interface per data collecting rules. An interface module receives a request to perform a business transaction from a caller application. The interface module determines a series of interface screens pursuant to data collecting rules associated with the requested business transaction. The series of interface screens have a subsection which enables a user of the caller application to provide a value of an attribute component of the subsection. The value provided by the user is employed in performing the business transaction. A result of the business transaction is produced to the caller application.

20 Claims, 9 Drawing Sheets

EXAMPLE OF ACCOUNTING RULE TABLE DESIGN

| COMPUTER SCREEN |
|---|
| E10　Navigation Trail |
| E20　Screen Title |
| E30　Application Tabs |
| E40　"Value Add" Statement |
| E50　Document Information |
| E60　Cost Object Label |
| E70　Cost Objects |
| E80　Other Accounting Detail |

EXPENSE ACCOUNTING DETAIL SCREEN TYPE:
SCREEN LAYOUT INSTANCE OF DATA GROUP TYPE ASEMBLY

BuyNow > Purchase Type > Product Category >

U20

Specify Accounting – for 4389 Black Ink Cartridge

U30

BuyNow\  CAM\

U40

Required fields are marked with an asterisk (*) and must be filled in to complete the form.

U50

Accounting for:    4389 Black Ink Cartridge
Purchase Type:    Expense
Product Category: Office supplies (600321)

U60

Select cost object:

⦿ Cost center:    [4HHA]    Get cost center

U70

○ Internal order:   [        ]    Get internal order

○ WBS element:   [        ]    Get WBS element

U80

Material number: [        ]

EXAMPLE SCREEN TYPE US_NAV INSTANCE OF DATA GROUP TYPE:
EXPENSE ACCOUNTING DETAIL FOR THE UNITED STATES

FIG. 3B

F10 — BuyNow > Purchase Type > GL Account >

F20 — Specify Accounting – for 4389 Black Ink Cartridge

F30 — BuyNow\ CAM\

F40 — Required fields are marked with an asterisk (*) and must be filled in to complete the form.

F50
- Accounting for: 4389 Black Ink Cartridge
- Purchase Type: Expense
- GL Account Id: Office supplies (600321)
- EU Directive: 2005/52/EC F60 — Select cost element(s):

F70
- ☐ Cost center: | 4HHA | Get cost center
- ☐ Internal order: | I37A-05573 | Get internal order EXAMPLE SCREEN TYPE FR_NAV INSTANCE OF DATA GROUP TYPE:
EXPENSE ACCOUNTING DETAIL FOR FRANCE

FIG. 3C

SYSTEM AND METHOD FOR DYNAMICALLY BUILDING A WEB INTERFACE PER DATA COLLECTING RULES

FIELD OF THE INVENTION

The present invention discloses a system and associated method for building interfaces to a web service module that is employed by multiple client programs governed by respective rules per data collecting rules.

BACKGROUND OF THE INVENTION

Conventional web interfaces are statically designed for a client application to interactively collect data from inputs by users in performing a transaction with a web service program. When multiple client applications share the web service program, each client application has similar but not identical requirements in collecting data to perform the transaction. Because a conventional web interface collecting data must be implemented corresponding to a respective data collecting rule, the web service program needs a same number of web interfaces as the number of data collecting rule, regardless of similarities among data collecting rules. Also, when a data collecting rule is changed, a corresponding web interface also should be modified to reflect such changes made in the data collecting rule.

Thus, there is a need for a system and associated method that overcomes at least one of the preceding disadvantages of current methods and systems for building a web interface of a service program shared among multiple client applications.

SUMMARY OF THE INVENTION

An embodiment of the invention provides a method for dynamically building a web interface per data collecting rules, the method comprising:

receiving a request for a business transaction from a caller application;

determining a flow of the web interface pursuant to the data collecting rules associated with the business transaction, wherein the flow of the web interface indicates an ordered set of at least one interface screen to collect at least one input data item from a user of the caller application, wherein the data collecting rules specify said at least one input data item in each interface screen of said at least one interface screen to collect said at least one input data item that is necessary to perform the business transaction;

determining a first interface screen of said at least one interface screen;

rendering the first interface screen for the user pursuant to the data collecting rules associated with the first interface screen;

collecting, from the user, said at least one input data item which is necessary to perform the business transaction with respect to the first interface screen; and storing the collected at least one input data item to a storage medium accessible by a business module, wherein said receiving, said determining the flow, said determining the first interface screen, said rendering, said collecting, and said storing are performed by an interface module coupled to the caller application.

An embodiment of the invention provides a computer program product, comprising a computer usable medium having a computer readable program code embodied therein, said computer readable program code containing instructions that when executed by a processor of a computer system implement a method for dynamically building a web interface per data collecting rules, the method comprising:

receiving a request for a business transaction from a caller application;

determining a flow of the web interface pursuant to the data collecting rules associated with the business transaction, wherein the flow of the web interface indicates an ordered set of at least one interface screen to collect at least one input data item from a user of the caller application, wherein the data collecting rules specify said at least one input data item in each interface screen of said at least one interface screen to collect said at least one input data item that is necessary to perform the business transaction;

determining a first interface screen of said at least one interface screen;

rendering the first interface screen for the user pursuant to the data collecting rules associated with the first interface screen;

collecting, from the user, said at least one input data item which is necessary to perform the business transaction with respect to the first interface screen; and storing the collected at least one input data item to a storage medium accessible by a business module, wherein said receiving, said determining the flow, said determining the first interface screen, said rendering, said collecting, and said storing are performed by an interface module coupled to the caller application.

An embodiment of the invention provides a computer system comprising a processor and a computer readable memory unit coupled to the processor, said memory unit containing instructions that when executed by the processor implement a method for dynamically building a web interface per data collecting rules, the method comprising:

receiving a request for a business transaction from a caller application;

determining a flow of the web interface pursuant to the data collecting rules associated with the business transaction, wherein the flow of the web interface indicates an ordered set of at least one interface screen to collect at least one input data item from a user of the caller application, wherein the data collecting rules specify said at least one input data item in each interface screen of said at least one interface screen to collect said at least one input data item that is necessary to perform the business transaction;

determining a first interface screen of said at least one interface screen;

rendering the first interface screen for the user pursuant to the data collecting rules associated with the first interface screen;

collecting, from the user, said at least one input data item which is necessary to perform the business transaction with respect to the first interface screen; and storing the collected at least one input data item to a storage medium accessible by a business module, wherein said receiving, said determining the flow, said determining the first interface screen, said rendering, said collecting, and said storing are performed by an interface module coupled to the caller application.

An embodiment of the invention provides a process for supporting computer infrastructure, said process comprising providing at least one support service for at least one of creating, integrating, hosting, maintaining, and deploying computer-readable code in a computing system, wherein the code in combination with the computing system is capable of performing a method for dynamically building a web interface per data collecting rules, the method comprising:

receiving a request for a business transaction from a caller application;

determining a flow of the web interface pursuant to the data collecting rules associated with the business transaction, wherein the flow of the web interface indicates an ordered set of at least one interface screen to collect at least one input data item from a user of the caller application, wherein the data collecting rules specify said at least one input data item in each interface screen of said at least one interface screen to collect said at least one input data item that is necessary to perform the business transaction;

determining a first interface screen of said at least one interface screen;

rendering the first interface screen for the user pursuant to the data collecting rules associated with the first interface screen;

collecting, from the user, said at least one input data item which is necessary to perform the business transaction with respect to the first interface screen; and storing the collected at least one input data item to a storage medium accessible by a business module, wherein said receiving, said determining the flow, said determining the first interface screen, said rendering, said collecting, and said storing are performed by an interface module coupled to the caller application.

An embodiment of the invention provides a method and system that overcomes at least one of the current disadvantages of conventional method and system for building user interface screens for web application.

BRIEF DESCRIPTION OF THE DRAWINGS

FIG. 3A illustrates an example of a screen layout of accounting information, in accordance with the embodiments of the present invention.

FIG. 3B illustrates a first instance of the screen layout example of FIG. 3A, representing expense accounting details for the United States, in accordance with the embodiments of the present invention.

FIG. 3C illustrates a second instance of the screen layout example of FIG. 3A, representing expense accounting details for France, in accordance with the embodiments of the present invention.

DETAILED DESCRIPTION OF THE INVENTION

Figure 1:
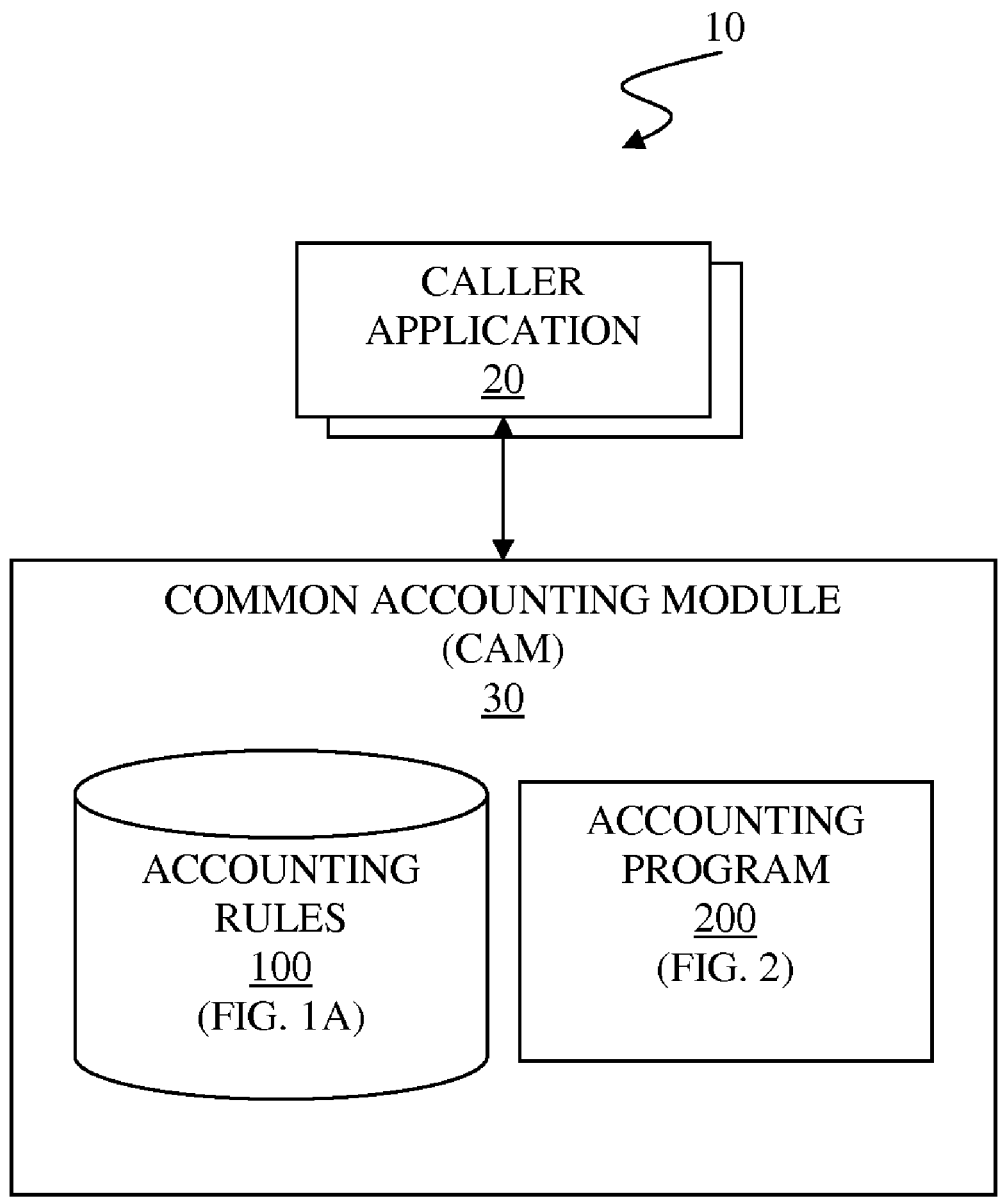
FIG. 1 illustrates a system for dynamically building a web interface per data collecting rules, in accordance with embodiments of the present invention.

FIG. 1 illustrates a system 10 for dynamically building a web interface per data collecting rules, in accordance with embodiments of the present invention.

The system 10 comprises a caller application 20 of at least one caller application and a common accounting module (hereinafter CAM) 30. The CAM 30 comprises accounting rules 100 and an accounting program 200. The accounting rules 100 are stored in a storage unit that is accessible by the accounting program 200. The accounting program 200 is executed on a computer system that is coupled to the storage unit. The system 10 may be a part of an integrated system that utilizes accounting functionalities of the system 10. An example of the integrated system may be, inter alia, a general ledger system, etc.

The caller application 20 sends a request of a user to the CAM 30 to collect data for a business transaction through a web interface. The web interface comprises at least one user interface screen with data items that should be collected for the accounting program 200. The user initiates the business transaction that requires services by the CAM 30. Examples of the business transaction may be, inter alia, purchases of office supplies, etc. The CAM 30 dynamically builds the web interface according to the request for a data collection from the caller application 20. The web interface is rendered based on content of the accounting rules 100 that governs the requested data collection.

The accounting rules 100 are a group of data controlling rules employed by the accounting program 200. In this specification, the accounting rules 100 refer to the data collecting rules for the accounting program 200. The accounting rules 100 specify data collection requirements based on various business scenarios. See FIG. 1A, infra, for details of the accounting rules 100.

The accounting program 200 interprets and/or implements the accounting rules 100. The accounting program 200 also describes how to dynamically configure content of the web interface for the user of the caller application 20 corresponding to the accounting rules 100. The accounting program 200 builds the web interface comprising dynamic content, that guide the user of the caller application 20 through a process collecting accounting data. Through the web interface, the user of the caller application 20 provides input to the accounting program 200. Because the accounting program 200 processes the accounting rules 100 that specifies data requirements, the accounting program 200 does not need to be modified upon an update of the accounting rules 100 caused by new accounting requirements and/or changes in accounting requirements. See FIG. 2, infra, for details of the accounting program 200.

In one embodiment of the present invention, the system 10 is used for a general procurement of products/services. An employee of Corporation A utilizes the system to create purchase requisitions that result in purchase orders being sent to suppliers who provide these goods. The products may be, inter alia, office supplies, computer peripherals, laptop software, and specialized communications services, etc. The employee of Corporation A uses the caller application 20 that invokes the CAM 30 to create the purchase requisition. The CAM 30 is used to collect accounting information according to the accounting rules 100 that formulate financial policies of Corporation A. The CAM 30 guides the employee through accounting data collection process by rendering interface screens based on the Purchasing Scenario specifying a commodity being purchased, an intended use for a purchased item, etc.

Figure 1A:
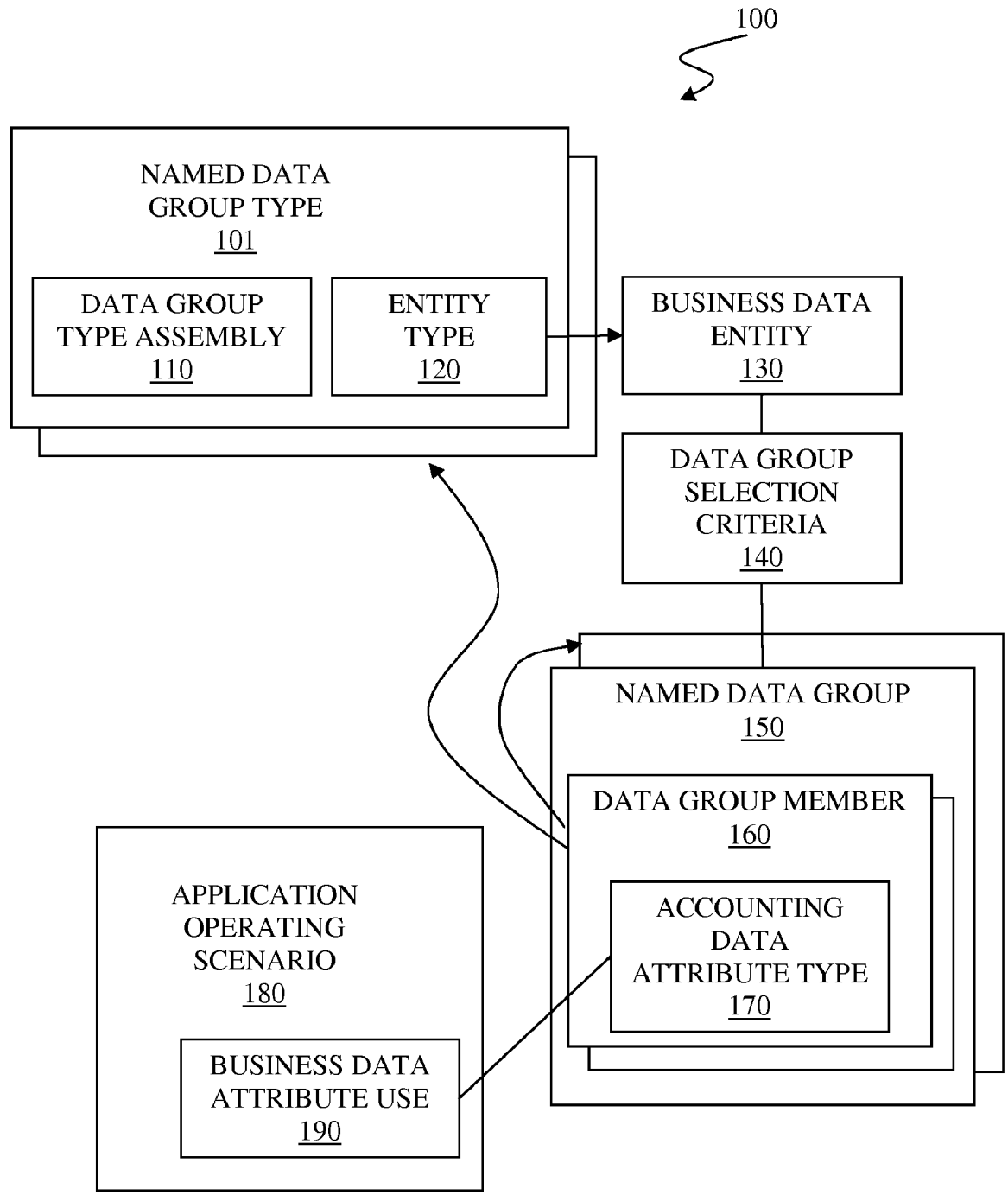
FIG. 1A illustrates data collecting rules for accounting transactions used in dynamically building a web interface, in accordance with the embodiments of the present invention.

FIG. 1A illustrates details of the accounting rules 100 of FIG. 1, supra, used in dynamically building a web interface, in accordance with the embodiments of the present invention.

The web interface is built according to the accounting rules 100 by the accounting program and then displayed on an output device of a computer system as a series of screens. Each screen in the web interface is a collection of data items that are required by the accounting rules 100 for the accounting program to perform a specific transaction. The accounting rules 100 are configured by an administrator of the accounting program to determine and to dynamically instantiate data items in each screen of the web interface.

The accounting rules 100 comprise at least one Named Data Group Type, at least one Business Data Entity, at least one Data Group Selection Criteria, at least one Named Data Group, and at least one Application Operating Scenario.

A Named Data Group Type 101 of the at least one Named Data Group Type comprises a Data Group Type Assembly 110 and an Entity Type 120. The Named Data Group Type 101 specifies a collection of data items that is either a web page or a subsection of a web page to render. The Named Data Group Type 101 is instantiated by data in the accounting rules 100 and rendered on the output device. See descriptions of FIGS. 3A, 3B, and 3C, infra, for an example.

The Data Group Type Assembly 110 of the Named Data Group Type 101 specifies an instance of the Named Data Group Type 101, either a web page instance or a subsection of the web page instance.

The Entity Type 120 of the Named Data Group Type 101 indicates an organization or a group of users that governs the specific content in the instance of the Named Data Group Type 101 that is specified by the Data Group Type Assembly 110.

A Business Data Entity 130 of the at least one Business Data Entity is built by the accounting program for a specific instance of the entity type 120.

A Data Group Selection Criteria 140 of the at least one Data Group Selection Criteria is determined by the Business Data Entity 130. The Data Group Selection Criteria 140 is used to select a Named Data Group 150 of the at least one Named Data Group pursuant to specific requirements for data collection for an Application Operating Scenario 180 of the at least one Application Operating Scenario.

A Named Data Group 150 of the at least one Named Data Group is selected by the Data Group Selection Criteria 140 that corresponds to the Business Data Entity 130 that is an instance of the Entity Type 120.

The Named Data Group 150 is a configuration of the Named Data Group Type 101. The Named Data Group Type 101 may have multiple configurations that each of such configurations is a respective Named Data Group. The Named Data Group 150 comprises at least one Data Group Member that is an elemental data attribute with all information necessary to render the elemental data attribute in the instance.

The Named Data Group 150 comprises at least one Data Group Member. A Data Group Member 160 of the at least one Data Group Member may be another Named Data Group Type, another Named Data Group, an Accounting Data Attribute Type 170, or a data instance. The Data Group Member 160 that is another Named Data Group Type is used to find a best-fit instance of the Named Data Group 150. The Data Group Member 160 that is another Named Data Group must be decomposed into the Accounting Data Attribute Type 170 or the data instance.

The Accounting Data Attribute Type 170 represents an elemental data item that is provided by either the caller application or inputs by a user of the caller application. The Accounting Data Attribute Type 170 is selected by a Business Data Attribute Use 190.

The Application Operating Scenario 180 comprises the Business Data Attribute Use 190. The Application Operating Scenario 180 further comprises a superset of the Accounting Data Attribute Type 170. The Business Data Attribute Use 190 configures which Accounting Data Attribute Types should be selected for an instance of the Application Operating Scenario 180. In one embodiment of the present invention the superset of the Accounting Data Attribute Type is a Financial Data Attribute Types.

Figure 1B:
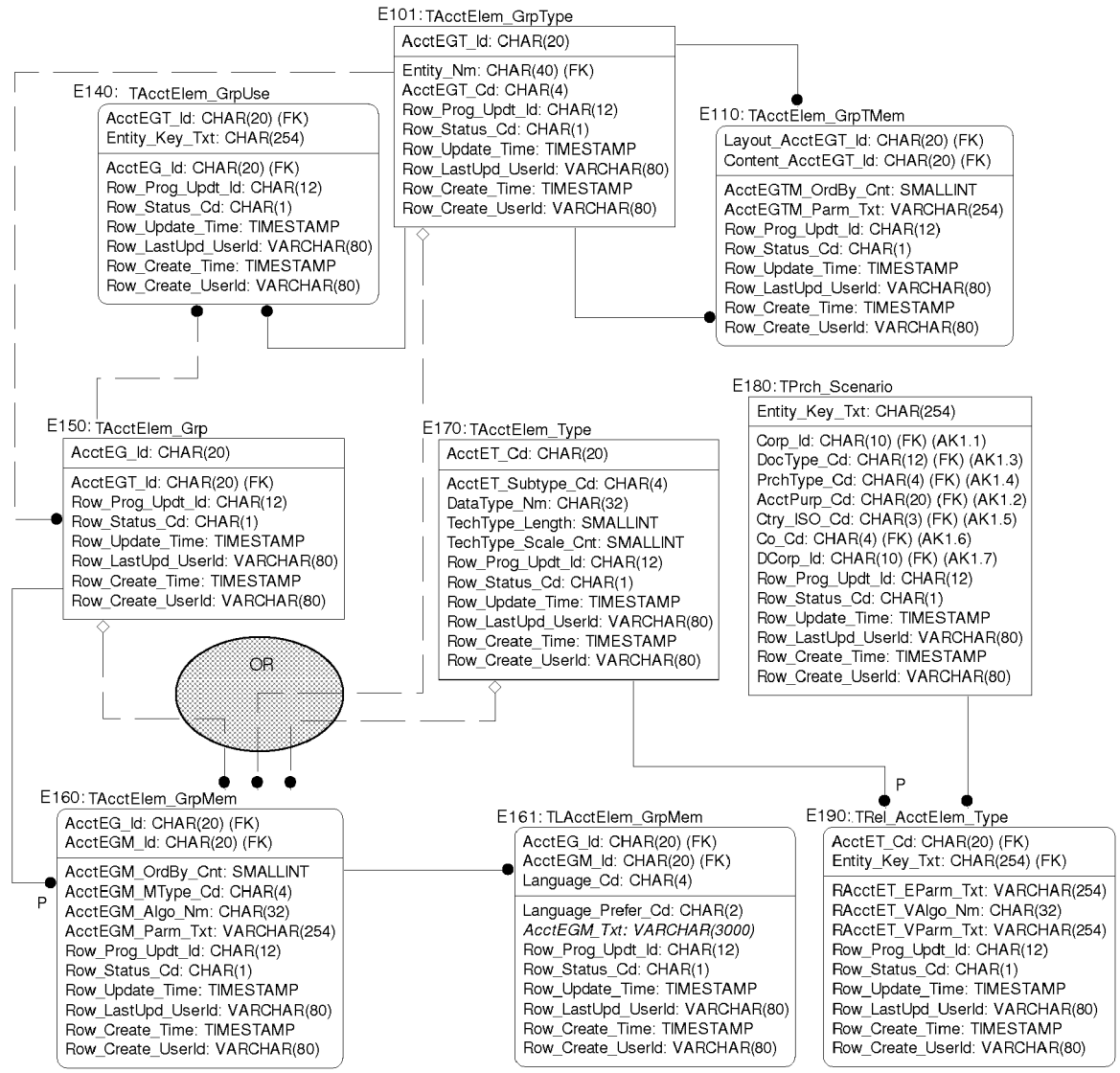
FIG. 1B illustrates an example of the data collecting rules for accounting transactions implemented as relational database records, in accordance with the embodiments of the present invention.

FIG. 1B illustrates an example of the data collecting rules for accounting transactions implemented as relational database records, in accordance with the embodiments of the present invention.

In this embodiment, the data collecting rules for accounting transactions are referred to as accounting rules. The accounting rules comprise a TAcctElem_GrpType E101, a TAcctElem_GrpTMem E110, a TAcctElem_GrpUse E140, a TAcctElem_Grp E150, a TAcctElem_GrpMem E160, a TLAcctElem_GrpMem E161, a TAcctElem_Type E170, a TPrch_Scenario E180, and a TRe1_AcctElem_Type E190.

The TAcctElem_GrpType E101 is a relational data table instance corresponding to the Named Data Group Type 101 of FIG. 1A, supra. The TAcctElem_GrpType E101 represents an accounting element group type that names either screens, or web-pages, that CAM must render, or names portions/content of screens.

The TAcctElem_GrpTMem E110 is a relational data table instance corresponding to the Data Group Type Assembly 110 of FIG. 1A, supra. The TAcctElem_GrpTMem E110 defines a screen layout by naming necessary content types in the proper order.

The TAcctElem_GrpUse E140 is a relational data table instance corresponding to the Data Group Selection Criteria 140 of FIG. 1A, supra. The TAcctElem_GrpUse E140 identifies a best fit content based on information provided by an employee of a company. For example, a purchasing country may drive certain words to appear as labels or instructions on the screen.

The TAcctElem_Grp E150 is a relational data table instance corresponding to the Named Data Group 150 of FIG. 1A, supra. To compose screens, the TAcctElem_Grp E150 comprises a name for, inter alia, a data item of screen content, a set of labels, accounting element types, or instructional statements that are used. etc., and a respective values, such as Cart Ids or GL Account Ids, for each name.

The TAcctElem_GrpMem E160 is a relational data table instance corresponding to the Data Group Member 160 of FIG. 1A, supra. The TAcctElem_GrpMem E160 members are either labels or are configured Account Element Types. The TAcctElem_GrpMem E160 members are associated with a respective text string in a translation table illustrated as the TLAcctElem_GrpMem E161. The respective text string is displayed on a screen.

The TAcctElem_Type E170 is a relational data table instance corresponding to the Accounting Data Attribute Type 170 of FIG. 1A, supra. A configured super-set of valid data elements that are either presented to or collected from the user of the Common Accounting Module (CAM).

The TPrch_Scenario E180 is a relational data table instance corresponding to the Application Operating Scenario 180 of FIG. 1A, supra. The TPrch_Scenario E180 represents an instance of the Purchasing Scenario. The TPrch_Scenario E180 defines a business scenario which has unique requirements regarding the accounting information that must be collected, or accounting rules which must be applied. A Purchasing Scenario varies per, inter alia, a business process to be performed such as creating a request, approving a request, altering a request, etc., an entity that had initiated the request, a type of document/transaction that has been initiated, etc.

The TRe1_AcctElem_Type E190 is a relational data table instance corresponding to the Business Data Attribute Use 190 of FIG. 1A, supra. The TRe1_AcctElem_Type E190 maps accounting element types from the TAcctElem_Type E170 to a relevant purchasing scenarios in the TPrch_Scenario E180.

Figure 2:
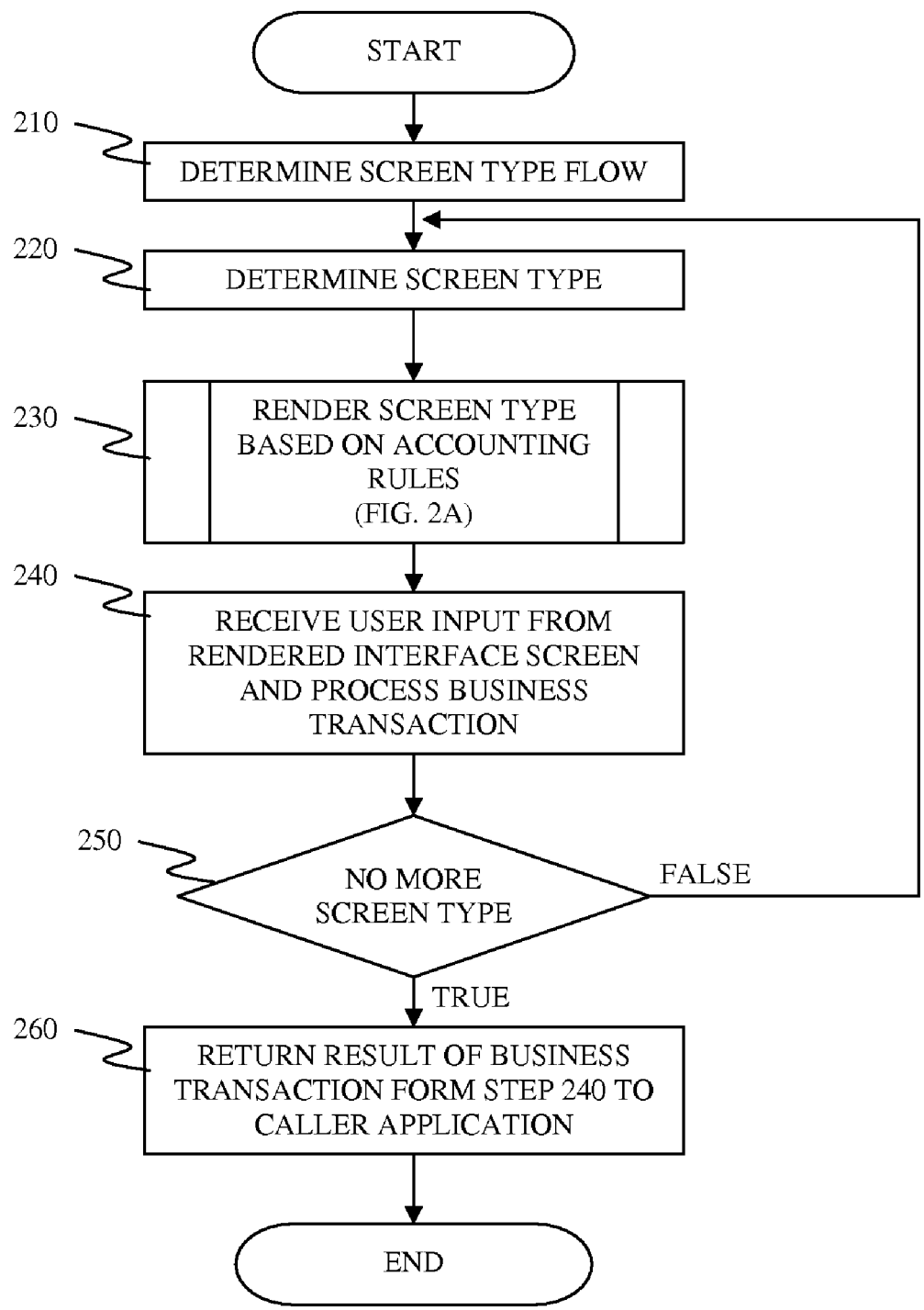
FIG. 2 is a flowchart depicting a method for dynamically building a web interface per data collecting rules, in accordance with the embodiments of the present invention.

FIG. 2 is a flowchart depicting a method for dynamically building a web interface per data collecting rules, in accordance with the embodiments of the present invention.

Prior to step 210, the CAM receives a request to collect data per data collecting rules from a caller application. The CAM builds interface screens to receive user input data from a user pursuant to the data collecting rules to perform a business transaction and/or to process a document with the user input data received through the interface screens by performing the method of the present invention described in steps 210, 220, 230, 240, 250, and 260.

The caller application also provides the CAM information as to mandatory data attributes about the business transaction that requires accounting information to be collected. Examples of such business transactions may be, inter alia, a Purchase Requisition and Payment Request. An interface configuration is determined by a type of business transaction that is required In one embodiment, the business transaction is a purchase requisition received by the CAM from the caller application referred to as BuyNow. To service the purchase requisition, the CAM needs business data specified in the data collecting rules. Examples of necessary business data may be, inter alia, a Company that is liable for the purchase, a Commodity of at least one item that has been purchased, a Country in which the Company is incorporated, a Document Type for which accounting data is being collected such as a purchase requisition, an activity being performed on the Document such as creation or approval, etc.

In step 210, the CAM determines a screen type flow that specifies an ordered series of screens to be presented to a user pursuant to a data collecting rule of the business transaction that has been requested by the caller application. The caller application provides the interface configuration of the screen type flow that specifies types of screens to be presented and the order of presentation of screens.

In step 220, the CAM determines a first screen type to build. Steps 220, 230, 240, and 250 are performed for each screen type to be built as specified by the interface configuration provided by the caller application.

In step 230, the CAM renders an interface screen to an output device such that the user of the CAM can provide the user input data. The interface screen is an instance of the first screen type pursuant to the accounting rules, which is the data collecting rule for the business transaction. See the description of FIG. 2A, infra, for details of step 230.

In step 240, the CAM receives the user input data through the interface screen that has been rendered in step 230. The CAM collects each item of the user input data necessary to process the business transaction through a respective input field associated with said each item within the interface screen.

In step 250, the CAM determines whether there is more screen type to build in the interface configuration. If the CAM determines that there is more screen type to build, the CAM loops back to step 220 to process next screen type. If the CAM determines that there is no more screen type to build, that is, all screen types in the interface configuration are built and rendered, the CAM proceeds with step 260.

In step 260, the CAM processes the business transaction with the user input data collected in step 240 and returns a result of the business transaction to the caller application.

Figure 2A:
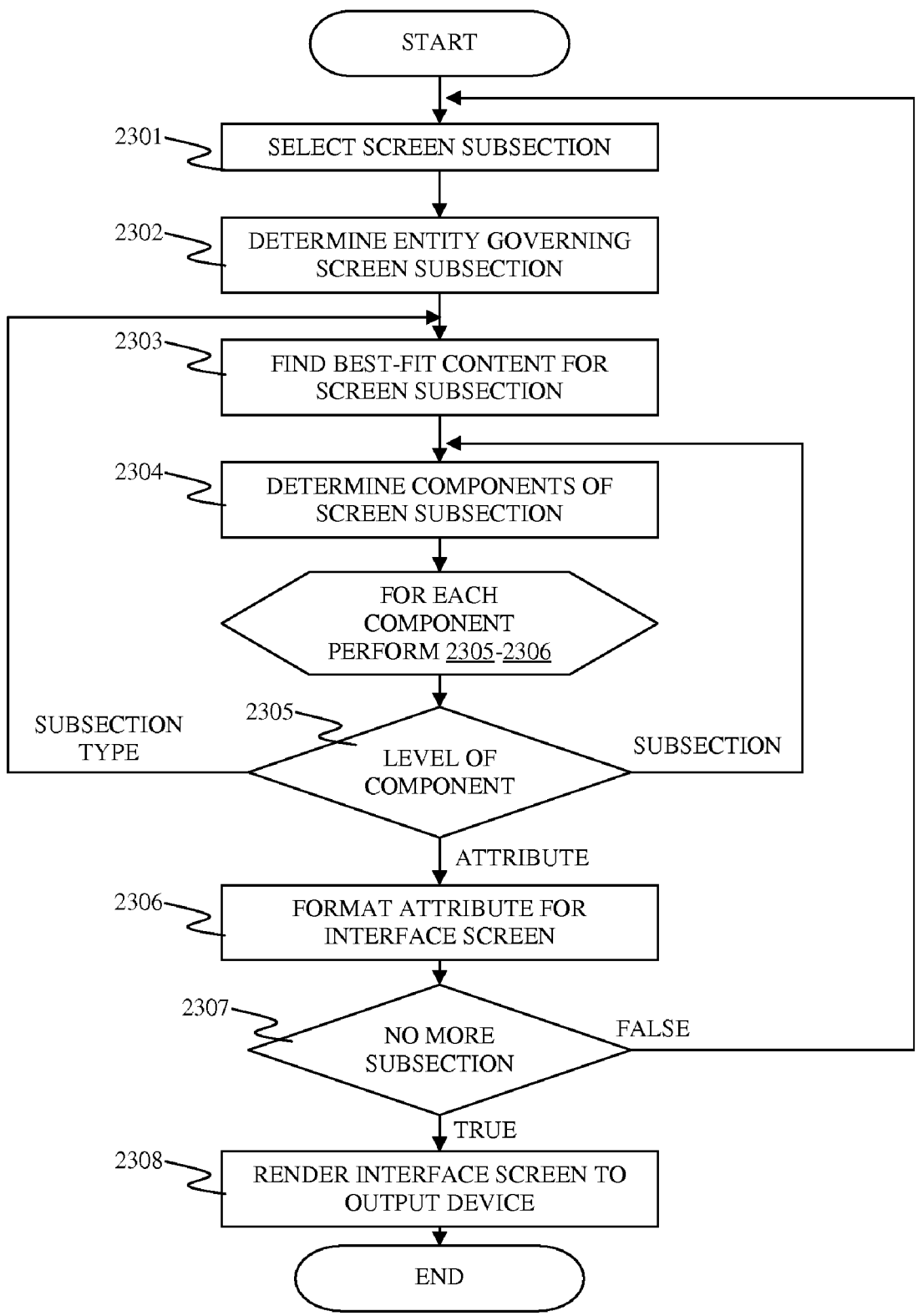
FIG. 2A is a flowchart depicting step 230 of FIG. 2, rendering a screen type, in accordance with the embodiments of the present invention.

FIG. 2A is a flowchart depicting step 230 of FIG. 2, supra, that renders an instance of a screen type, in accordance with the embodiments of the present invention.

In step 2301, the CAM selects a screen subsection of the screen type pursuant to a value of the Data Group Type Assembly of the accounting rules. Steps 2301, 2302, 2303, 2304, 2305, 2306, and 2307 are performed for each screen subsection of the screen type.

In step 2302, the CAM determines an entity governing the screen subsection that has been selected in step 2301 pursuant to values of the Data Group Type and the Entity Type. The CAM builds an entity key that is used to provide a best-fit content for the screen subsection in step 2303 infra.

In step 2303, the CAM finds a best-fit content for the screen subsection that is a specific instance of the Named Data Group using the entity key built in step 2302. The best-fit content is selected from several Named Data Groups that denote a specific content for the subject Screen Subsection or Named Data Group Type pursuant to values of the Data Group Selection Criteria and the Data Group.

In step 2304, the CAM determines components of the screen subsection pursuant to values of the Data Group Member. For each component of the screen subsection, the CAM performs step 2305 and subsequently processes each component pursuant to the determination made in step 2305.

In step 2305, the CAM determines a level of the component. If the CAM determines that the component is a subsection type pursuant to values of the Named Data Group Type, the CAM loops back to step 2303. If the CAM determines that the component is a subsection pursuant to values of the Data Group Member, the CAM loops back to step 2304. If the CAM determines that the component is an attribute pursuant to values of the Data Attribute Type and the Business Data Attribute Use, the CAM proceeds with step 2306. All components of the subsection are processed until each component is determined to be an attribute by repeating step 2305 and subsequent steps for a subsection component or a subsection type component.

In step 2306, the CAM formats all attributes of the screen subsection to render the interface screen pursuant to values of the Business Data Attribute Use or the Data Group Member, if the Business Data Attribute Use does not have a value configuring the same attribute.

In step 2307, the CAM determines whether there is any screen subsection left unprocessed in the interface screen. If the CAM determines that there is more screen subsection to be processed in the interface screen, the CAM loops back to step 2301 to process next screen subsection. If the CAM determines that there is no more screen subsection in the interface screen left unprocessed, the CAM proceeds with step 2308.

In step 2308, the CAM renders the interface screen with all screen subsections to the output device.

FIGS. 3A, 3B, and 3C illustrate an example of a screen type of accounting information and two instances of the screen layout, in accordance with the embodiments of the present invention.

FIG. 3A illustrates a specific screen type and screen subsections of the Named Data Group Type referred to as an Expense Accounting Detail (EAD) Screen Type that is used to collect accounting data for a purchased item that is categorized as an expense. The Data Group Type Assembly of the EAD Screen Type describes the screen layout comprising screen subsections of the EAD Screen Type. The screen subsections of the EAD Screen Type are instances of the Named Data Group. The screen layout of FIG. 3A is a prototype of two actual instances of interface screens built shown in FIGS. 3B and 3C. Interface screens of FIGS. 3B and 3C have an identical Expense Accounting Detail (EAD) Screen Type, but rendered differently due to difference in respective governing entity.

FIG. 3B illustrates a US_NAV interface screen as a first instance of the Expense Accounting Detail Screen Type, which represents an expense accounting detail screen for the United States.

FIG. 3C illustrates a FR_NAV interface screen as a second instance of the Expense Accounting Detail Screen Type, which represents an expense accounting detail screen for France, or other European country.

As shown in FIGS. 3B and 3C, each instance of interface screens may have different content for screen subsections or there may be a screen subsection that is not rendered at all in a specific instance pursuant to values of the Application Operating Scenario.

The Expense Accounting Detail (EAD) Screen Type comprises eight (8) screen subsections: a Navigation Trail E10, a Screen Title E20, an Application Tabs E30, a Value Add Statement E40, a Document Information E50, a Cost Object Label E60, a Cost Objects E70, and an Other Accounting Detail E80. Each screen subsection represents a group of one or more instances of the Accounting Data Attribute Type referred to as an attribute. Attributes are included in or excluded from a screen subsection based on the Application Operating Scenario, which is also referred to in the example as the Purchasing Scenario. Attributes may be provided by the caller application or may be collected by the CAM from user input data. Attributes such as "Accounting for", "EU Directive" are provided by the caller application. Attributes such as "GL Account Id", "Purchase Type", "Cost Center" are collected by the CAM through the interface screen.

The Navigation Trail E10 screen subsection displays attributes describing a trail of the EAD interface screen. As illustrated in FIGS. 3B and 3C, the Navigation Trail of the US_NAV interface screen U10 has a "Product Category" attribute, while the Navigation Trail of the FR_NAV interface screen F10 has a "GL Account" attribute to display the same EAD interface screen pursuant to the Purchasing Scenario for the respective entity.

The Navigation Trail E10 is governed by an Entity Type "Country Document Type" such that content of the Navigation Trail is determined by the Country in which the purchase originated and the type of document for which accounting information is being collected. Examples of the Document Type may be, inter alia, Purchase Requisition, Payment Request, etc.

The Screen Title E20 screen subsection represents the title of the screen that will be displayed to a user.

The Application Tabs E30 screen subsection represents a tabbed appearance for the user to navigate back to the calling application, while still exposing to the user that they are actually in the CAM application, and not in BuyNow.

The Value Add Statement E40 screen subsection represents instructions to the user how to provide information requested in a currently displayed screen.

The Document Information E50 screen subsection displays attributes regarding a document necessary for the Purchase Requisition. The Document Information screen subsection of the FR_NAV interface screen F50 presents an "EU Directive" attribute to display any applicable European Union directives that apply to the item being purchased, which is not required in the Document Information screen subsection of the US_NAV interface screen U50.

The Cost Object Label E60 screen subsection displays a text describing screen subsection the Cost Objects E70.

The Cost Objects E70 screen subsection displays instances of Accounting Data Attribute Type such as "Cost Center" and "Internal Order."

The Cost Objects screen subsection for US_NAV interface screen U70 displays "WBS element" attribute but the Cost Objects screen subsection for FR_NAV interface screen F70 does not display the "WBS element" attribute pursuant to the Purchasing Scenario for the respective entity that describes functional differences in financial policies of the respective entity.

Pursuant to a role of a user specified in the Purchasing Scenario, the user may have different interactions for a same attribute. In one embodiment of the present invention, a user of the US_NAV interface screen may be a Financial Approver as defined in the Purchasing Scenario. The Financial Approver user may edit attributes in the Cost Objects screen subsection U70 but cannot change the Material Number attribute in the Other Accounting Detail screen subsection U80. On the other hand, in the same embodiment, a user with a role to create a new purchase requisition may provide both the Material Number attribute and attributes in the Cost Objects screen subsection.

The Other Accounting Detail E80 screen subsection for US_NAV interface screen U80 displays "Material Number" attribute, while the Other Accounting Detail screen subsection E80 is entirely excluded for FR_NAV interface screen, pursuant to the Purchasing Scenario or the Data Group Selection Criterion for the respective entity, thereby limiting a user of the FR_NAV interface screen from providing any attributes in the Other Accounting Detail E80 screen subsection.

Figure 4:
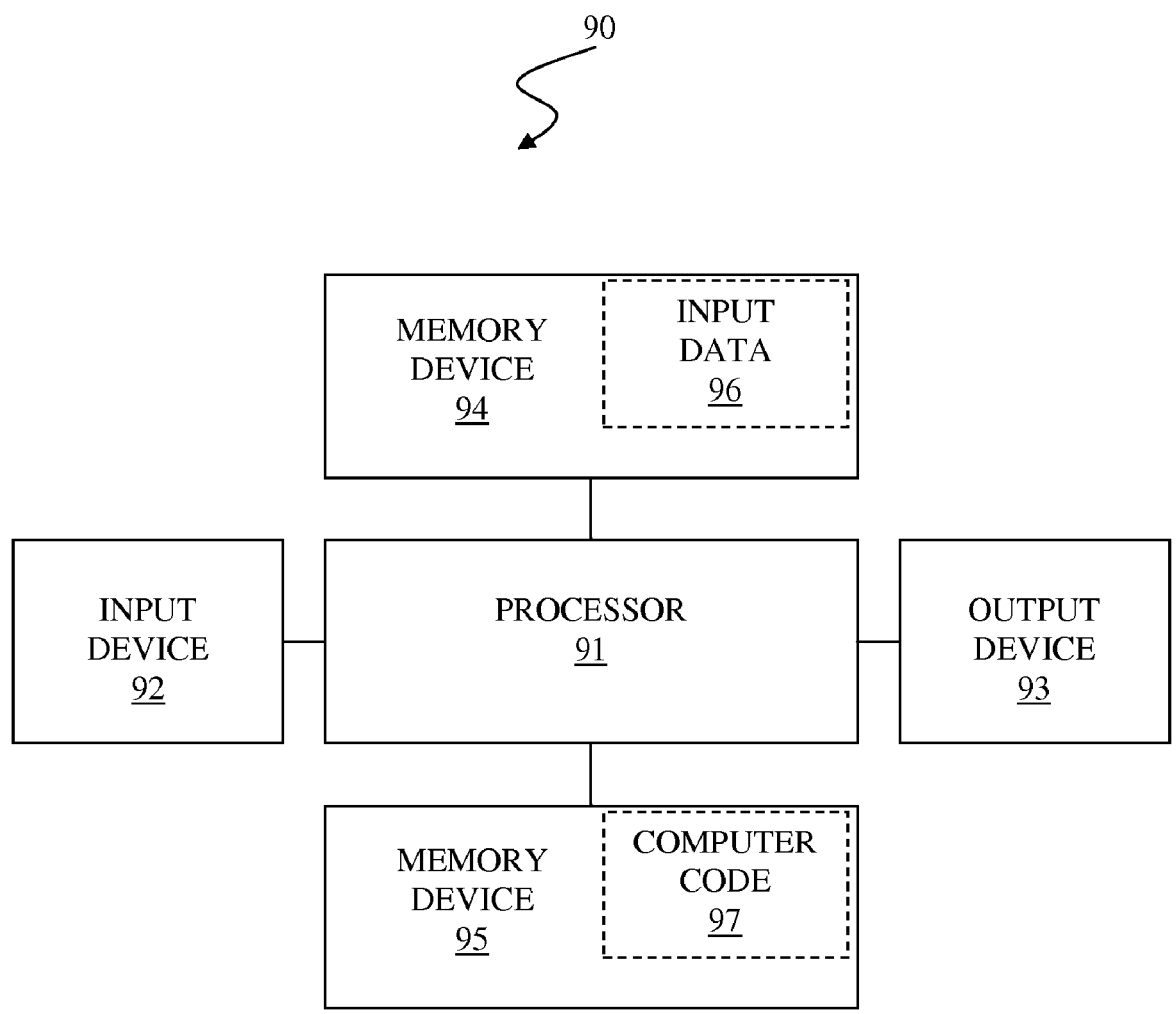
FIG. 4 illustrates a computer system used for dynamically building a web interface per data collecting rules, in accordance with embodiments of the present invention.

FIG. 4 illustrates a computer system 90 used for dynamically building a web interface per data collecting rules, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for dynamically building a web interface per data collecting rules according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for dynamically building a web interface per data collecting rules.

In another embodiment, the invention provides a business method that performs the process steps of the invention on a subscription, advertising and/or fee basis. That is, a service provider, such as a Solution Integrator, can offer to create, maintain, support, etc. a process for dynamically building a web interface per data collecting rules of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for dynamically building a web interface per data collecting rules, the method comprising:

receiving, by an interface module, a request for a business transaction from a caller application, wherein the caller application is operatively coupled to a business transaction module, wherein the business transaction module comprises the interface module, a business module, and a transaction data storage, wherein the transaction data storage stores the data collecting rules, wherein each business transaction of the business transaction module corresponds to a respective data collecting rule of said data collecting rules, wherein the respective data collecting rule specifies respective requirements in collecting data to perform said each business transaction based on a respectively associated business scenario, wherein a first data collecting rule of said data collecting rules comprises a first application operating scenario, at least one named data group type, at least one named data group, a first business data entity, and a first data group selection criteria, such that the first data collecting rule specifies how to collect data items defined by a first named data group of said at least one named data group formulated based on a first named data group type of said at least one named data group type, wherein the data items satisfy the first data group selection criteria while the business module operates according to the first application operating scenario, and wherein the first business data entity is a first group of users who governs content in instances of the first data group type;

determining a flow pursuant to the first data collecting rule, wherein the first data collecting rule is associated with the business transaction specified in the request, wherein the flow defines an ordered set of at least one interface screen that is automatically generated by the interface module, wherein the flow enables the interface module to interactively collect a collection of input data items from a user of the caller application, wherein the collection of input data items is necessary to perform the business transaction, wherein the first data collecting rule specify, for each interface screen of said at least one interface screen of the flow, a respective set of input data items to collect, wherein the respective set of input data items are a respective subset of the collection of input data items;

determining a first interface screen of the determined flow, wherein the first interface screen comprises a first screen subsection and a first entity corresponding to the first screen subsection, wherein the first screen subsection is an instance of the first named data group comprising at least one component, and each component of said at least one component comprises at least one attribute, and wherein each attribute of said at least one attribute is an elemental data instance that is a respective parameter of the business transaction, wherein the first entity defines a first group of users who govern content of the first screen subsection, and wherein the user of the caller application is a member of the first entity;

rendering the first interface screen for the user pursuant to the first data collecting rule;

collecting a first set of input data items of the collection of input data items, from the user interacting with the interface module via the rendered first interface screen, wherein the first set of input data items corresponds to the first interface screen; and storing the collected first set of input data items in the transaction data storage stores such that the business module utilizes the stored first set of input data items in performing the business transaction, wherein said receiving, said determining the flow, said determining the first interface screen, said rendering, said collecting, and said storing are performed by the interface module.

2. The method of claim 1, the method further comprising:

subsequent to said collecting, generating, by the business module, a transaction result by performing the business transaction with parameters of the collection of input data items; and returning the transaction result from said generating to the caller application, wherein the flow is Expense Accounting Detail (EAD) Screen Type comprising eight (8) screen subsections selected from the group consisting of: a Navigation Trail, a Screen Title, an Application Tabs, a Value Add Statement, a Document Information, a Cost Object Label, a Cost Objects, and an Other Accounting Detail, wherein the first named data group is Accounting Data Attribute Type, and wherein each screen subsection represents a respective group of one or more instances for an attribute of the Accounting Data Attribute Type.

3. The method of claim 1, said rendering comprising:
selecting the first screen subsection of the first interface screen pursuant to the first data collecting rule;
determining the first entity that governs the first screen subsection pursuant to the first data collecting rule, wherein the first screen subsection is an instance of the first named data group as defined in the first data collecting rule, and wherein the first entity is an instance of the first business data entity defined in the first data collecting rule;
locating a best-fit content for the first screen subsection among contents stored in the transaction data storage pursuant to a first entity key value associated with the determined first entity, wherein the best-fit content is located by applying the data group selection criteria defined in the first data collecting rule;
determining that the first screen subsection comprises an attribute component based on the first data collecting rule, wherein the attribute component is mapped with an input data item of the first set of input data items, wherein the attribute component corresponds to an input field within the first screen subsection;
composing the first interface screen by use of the located best-fit content and the input field associated with the attribute component; and
displaying the composed first interface screen such that the interface module enables the user to provide the input data item as a value of the attribute component through the input field of the first interface screen.

4. The method of claim 1, said rendering comprising:
selecting the first screen subsection of the first interface screen pursuant to the first data collecting rule;
determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;
locating a best-fit content for the first screen subsection pursuant to a first entity key value associated with the determined first entity, wherein the best-fit content is located by applying the data group selection criteria defined in the first data collecting rule;
determining that the first screen subsection comprises a second screen subsection, wherein the second screen subsection comprises at least one attribute component based on the first data collecting rule, wherein each attribute component of said at least one attribute component is mapped with a respective input data item of the first set of input data items, wherein each attribute component corresponds to a respective input field within the second screen subsection;
composing the first interface screen by use of the located best-fit content and all input fields associated with said at least one attribute component; and
displaying the composed first interface screen such that the interface module enables the user to provide the respective input data item as a value of each attribute component through the respective input field of the first interface screen.

5. The method of claim 1, said rendering comprising:
selecting the first screen subsection of the first interface screen pursuant to the first data collecting rule;
determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;
locating a first display content for the first screen subsection among contents stored in the transaction data storage pursuant to a first entity key value associated with the determined first entity, wherein the first display content is located by applying the data group selection criteria defined in the first data collecting rule;
determining that the first screen subsection comprises a subsection type, wherein the subsection type comprises a second screen subsection and a second display content associated with the second subsection pursuant to the first data collecting rule, wherein the second screen subsection comprises at least one attribute component based on the first data collecting rule, wherein each attribute component of said at least one attribute component is mapped with a respective input data item of said at least one input data item, wherein each attribute component corresponds to a respective input field within the second screen subsection;
composing the first interface screen by use of the first display content, the second display content, and all input fields associated with said at least one attribute component; and
displaying the composed first interface screen such that the interface module enables the user to provide the respective input data item as a value of each attribute component through the respective input field of the first interface screen.

6. A computer program product, comprising a computer usable storage medium having a computer readable program code embodied therein, said computer readable program code containing instructions that when executed by a processor of a computer system implement a method for dynamically building a web interface per data collecting rules, the method comprising:
receiving, by an interface module, a request for a business transaction from a caller application, wherein the caller application is operatively coupled to a business transaction module, wherein the business transaction module comprises the interface module, a business module, and a transaction data storage, wherein the transaction data storage stores the data collecting rules, wherein each business transaction of the business transaction module corresponds to a respective data collecting rule of said data collecting rules, wherein the respective data collecting rule specifies respective requirements in collecting data to perform said each business transaction based on a respectively associated business scenario, wherein a first data collecting rule of said data collecting rules comprises a first application operating scenario, at least one named data group type, at least one named data group, a first business data entity, and a first data group selection criteria, such that the first data collecting rule specifies how to collect data items defined by a first named data group of said at least one named data group formulated based on a first named data group type of said at least one named data group type, wherein the data items satisfy the first data group selection criteria while the business module operates according to the first application operating scenario, and wherein the first business data entity is a first group of users who governs content in instances of the first data group type;

determining a flow pursuant to the first data collecting rule, wherein the first data collecting rule is associated with the business transaction specified in the request, wherein the flow defines an ordered set of at least one interface screen that is automatically generated by the interface module, wherein the flow enables the interface module to interactively collect a collection of input data items from a user of the caller application, wherein the collection of input data items is necessary to perform the business transaction, wherein the first data collecting rule specify, for each interface screen of said at least one interface screen of the flow, a respective set of input data items to collect, wherein the respective set of input data items are a respective subset of the collection of input data items;

determining a first interface screen of the determined flow, wherein the first interface screen comprises a first screen subsection and a first entity corresponding to the first screen subsection, wherein the first screen subsection is an instance of the first named data group comprising at least one component, and each component of said at least one component comprises at least one attribute, and wherein each attribute of said at least one attribute is an elemental data instance that is a respective parameter of the business transaction, wherein the first entity defines a first group of users who govern content of the first screen subsection, and wherein the user of the caller application is a member of the first entity;

rendering the first interface screen for the user pursuant to the first data collecting rule;

collecting a first set of input data items of the collection of input data items, from the user interacting with the interface module via the rendered first interface screen, wherein the first set of input data items corresponds to the first interface screen; and storing the collected first set of input data items in the transaction data storage stores such that the business module utilizes the stored first set of input data items in performing the business transaction, wherein said receiving, said determining the flow, said determining the first interface screen, said rendering, said collecting, and said storing are performed by the interface module.

7. The computer program product of claim 6, the method further comprising:

subsequent to said collecting, generating, by the business module, a transaction result by performing the business transaction with parameters of the collection of input data items; and returning the transaction result from said generating to the caller application, wherein the flow is Expense Accounting Detail (EAD) Screen Type comprising eight (8) screen subsections selected from the group consisting of: a Navigation Trail, a Screen Title, an Application Tabs, a Value Add Statement, a Document Information, a Cost Object Label, a Cost Objects, and an Other Accounting Detail, wherein the first named data group is Accounting Data Attribute Type, and wherein each screen subsection represents a respective group of one or more instances for an attribute of the Accounting Data Attribute Type.

8. The computer program product of claim 6, said rendering comprising:

selecting the first screen subsection of the first interface screen pursuant to the first data collecting rule;

determining the first entity that governs the first screen subsection pursuant to the first data collecting rule, wherein the first screen subsection is an instance of said at least one the first named data group as defined in the first data collecting rule, and wherein the first entity is an instance of the business data entity defined in the first data collecting rule;

locating a best-fit content for the first screen subsection among contents stored in the transaction data storage pursuant to a first entity key value associated with the determined first entity, wherein the best-fit content is located by applying the data group selection criteria defined in the first data collecting rule;

determining that the first screen subsection comprises an attribute component based on the first data collecting rule, wherein the attribute component is mapped with an input data item of the first set of input data items, wherein the attribute component corresponds to an input field within the first screen subsection;

composing the first interface screen by use of the located best-fit content and the input field associated with the attribute component; and displaying the composed first interface screen such that the interface module enables the user to provide the input data item as a value of the attribute component through the input field of the first interface screen.

9. The computer program product of claim 6, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a best-fit content for the first screen subsection pursuant to a first entity key value associated with the determined first entity, wherein the best-fit content is located by applying the data group selection criteria defined in the first data collecting rule;

determining that the first screen subsection comprises a second screen subsection, wherein the second screen subsection comprises at least one attribute component based on the first data collecting rule, wherein each attribute component of said at least one attribute component is mapped with a respective input data item of the first set of input data items, wherein each attribute component corresponds to a respective input field within the second screen subsection;

composing the first interface screen by use of the located best-fit content and all input fields associated with said at least one attribute component; and displaying the composed first interface screen such that the interface module enables the user to provide the respective input data item as a value of each attribute component through the respective input field of the first interface screen.

10. The computer program product of claim 6, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a first display content for the first screen subsection among contents stored in the transaction data storage pursuant to a first entity key value associated with the determined first entity, wherein the first display content is located by applying the data group selection criteria defined in the first data collecting rule;

determining that the first screen subsection comprises a subsection type, wherein the subsection type comprises a second screen subsection and a second display content associated with the second subsection pursuant to the first data collecting rule, wherein the second screen subsection comprises at least one attribute component based on the first data collecting rule, wherein each attribute component of said at least one attribute component is mapped with a respective input data item of said at least one input data item, wherein each attribute component corresponds to a respective input field within the second screen subsection;

composing the first interface screen by use of the first display content, the second display content, and all input fields associated with said at least one attribute component; and displaying the composed first interface screen such that the interface module enables the user to provide the respective input data item as a value of each attribute component through the respective input field of the first interface screen.

11. A computer system comprising a processor and a computer readable memory unit coupled to the processor, said memory unit containing instructions that when executed by the processor implement a method for dynamically building a web interface per data collecting rules, the method comprising:

receiving, by an interface module, a request for a business transaction from a caller application, wherein the caller application is operatively coupled to a business transaction module, wherein the business transaction module comprises the interface module, a business module, and a transaction data storage, wherein the transaction data storage stores the data collecting rules, wherein each business transaction of the business transaction module corresponds to a respective data collecting rule of said data collecting rules, wherein the respective data collecting rule specifies respective requirements in collecting data to perform said each business transaction based on a respectively associated business scenario, wherein a first data collecting rule of said data collecting rules comprises a first application operating scenario, at least one named data group type, at least one named data group, a first business data entity, and a first data group selection criteria, such that the first data collecting rule specifies how to collect data items defined by a first named data group of said at least one named data group formulated based on a first named data group type of said at least one named data group type, wherein the data items satisfy the first data group selection criteria while the business module operates according to the first application operating scenario, and wherein the first business data entity is a first group of users who governs content in instances of the first data group type;

determining a flow pursuant to the first data collecting rule, wherein the first data collecting rule is associated with the business transaction specified in the request, wherein the flow defines an ordered set of at least one interface screen that is automatically generated by the interface module, wherein the flow enables the interface module to interactively collect a collection of input data items from a user of the caller application, wherein the collection of input data items is necessary to perform the business transaction, wherein the first data collecting rule specify, for each interface screen of said at least one interface screen of the flow, a respective set of input data items to collect, wherein the respective set of input data items are a respective subset of the collection of input data items;

determining a first interface screen of the determined flow, wherein the first interface screen comprises a first screen subsection and a first entity corresponding to the first screen subsection, wherein the first screen subsection is an instance of the first named data group comprising at least one component, and each component of said at least one component comprises at least one attribute, and wherein each attribute of said at least one attribute is an elemental data instance that is a respective parameter of the business transaction, wherein the first entity defines a first group of users who govern content of the first screen subsection, and wherein the user of the caller application is a member of the first entity;

rendering the first interface screen for the user pursuant to the first data collecting rule;

collecting a first set of input data items of the collection of input data items, from the user interacting with the interface module via the rendered first interface screen, wherein the first set of input data items corresponds to the first interface screen; and storing the collected first set of input data items in the transaction data storage stores such that the business module utilizes the stored first set of input data items in performing the business transaction, wherein said receiving, said determining the flow, said determining the first interface screen, said rendering, said collecting, and said storing are performed by the interface module.

12. The computer system of claim 11, the method further comprising:

subsequent to said collecting, generating, by the business module, a transaction result by performing the business transaction with parameters of the collection of input data items; and returning the transaction result from said generating to the caller application, wherein the flow is Expense Accounting Detail (EAD) Screen Type comprising eight (8) screen subsections selected from the group consisting of: a Navigation Trail, a Screen Title, an Application Tabs, a Value Add Statement, a Document Information, a Cost Object Label, a Cost Objects, and an Other Accounting Detail, wherein the first named data group is Accounting Data Attribute Type, and wherein each screen subsection represents a respective group of one or more instances for an attribute of the Accounting Data Attribute Type.

13. The computer system of claim 11, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a best-fit content for the first screen subsection among contents stored in the transaction data storage pursuant to a first entity key value associated with the determined first entity, wherein the best-fit content is located by applying the data group selection criteria defined in the first data collecting rule;

determining that the first screen subsection comprises an attribute component based on the first data collecting rule, wherein the attribute component is mapped with an input data item of the first set of input data items, wherein the attribute component corresponds to an input field within the first screen subsection;

composing the first interface screen by use of the located best-fit content and the input field associated with the attribute component; and displaying the composed first interface screen such that the interface module enables the user to provide the input data item as a value of the attribute component through the input field of the first interface screen.

14. The computer system of claim 11, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a best-fit content for the first screen subsection pursuant to a first entity key value associated with the determined first entity, wherein the best-fit content is located by applying the data group selection criteria defined in the first data collecting rule;

determining that the first screen subsection comprises a second screen subsection, wherein the second screen subsection comprises at least one attribute component based on the first data collecting rule, wherein each attribute component of said at least one attribute component is mapped with a respective input data item of the first set of input data items, wherein each attribute component corresponds to a respective input field within the second screen subsection;

composing the first interface screen by use of the located best-fit content and all input fields associated with said at least one attribute component; and displaying the composed first interface screen such that the interface module enables the user to provide the respective input data item as a value of each attribute component through the respective input field of the first interface screen.

15. The computer system of claim 11, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a first display content for the first screen subsection among contents stored in the transaction data storage pursuant to a first entity key value associated with the determined first entity, wherein the first display content is located by applying the data group selection criteria defined in the first data collecting rule;

determining that the first screen subsection comprises a subsection type, wherein the subsection type comprises a second screen subsection and a second display content associated with the second subsection pursuant to the first data collecting rule, wherein the second screen subsection comprises at least one attribute component based on the first data collecting rule, wherein each attribute component of said at least one attribute component is mapped with a respective input data item of said at least one input data item, wherein each attribute component corresponds to a respective input field within the second screen subsection;

composing the first interface screen by use of the first display content, the second display content, and all input fields associated with said at least one attribute component; and displaying the composed first interface screen such that the interface module enables the user to provide the respective input data item as a value of each attribute component through the respective input field of the first interface screen.

16. A process for supporting computer infrastructure comprising a computer system, said process comprising providing at least one support service for at least one of creating, integrating, hosting, maintaining, and deploying computer-readable code in the computing system, wherein the code in combination with the computing system is capable of dynamically building a web interface per data collecting rules, said building comprising:

receiving, by an interface module, a request for a business transaction from a caller application, wherein the caller application is operatively coupled to a business transaction module, wherein the business transaction module comprises the interface module, a business module, and a transaction data storage, wherein the transaction data storage stores the data collecting rules, wherein each business transaction of the business transaction module corresponds to a respective data collecting rule of said data collecting rules, wherein the respective data collecting rule specifies respective requirements in collecting data to perform said each business transaction based on a respectively associated business scenario, wherein a first data collecting rule of said data collecting rules comprises a first application operating scenario, at least one named data group type, at least one named data group, a first business data entity, and a first data group selection criteria, such that the first data collecting rule specifies how to collect data items defined by a first named data group of said at least one named data group formulated based on a first named data group type of said at least one named data group type, wherein the data items satisfy the first data group selection criteria while the business module operates according to the first application operating scenario, and wherein the first business data entity is a first group of users who governs content in instances of the first data group type;

determining a flow pursuant to the first data collecting rule, wherein the first data collecting rule is associated with the business transaction specified in the request, wherein the flow defines an ordered set of at least one interface screen that is automatically generated by the interface module, wherein the flow enables the interface module to interactively collect a collection of input data items from a user of the caller application, wherein the collection of input data items is necessary to perform the business transaction, wherein the first data collecting rule specify, for each interface screen of said at least one interface screen of the flow, a respective set of input data items to collect, wherein the respective set of input data items are a respective subset of the collection of input data items;

determining a first interface screen of the determined flow, wherein the first interface screen comprises a first screen subsection and a first entity corresponding to the first screen subsection, wherein the first screen subsection is an instance of the first named data group comprising at least one component, and each component of said at least one component comprises at least one attribute, and wherein each attribute of said at least one attribute is an elemental data instance that is a respective parameter of the business transaction, wherein the first entity defines a first group of users who govern content of the first screen subsection, and wherein the user of the caller application is a member of the first entity;

rendering the first interface screen for the user pursuant to the first data collecting rule; collecting a first set of input data items of the collection of input data items, from the user interacting with the interface module via the rendered first interface screen, wherein the first set of input data items corresponds to the first interface screen; and storing the collected first set of input data items in the transaction data storage stores such that the business module utilizes the stored first set of input data items in performing the business transaction, wherein said receiving, said determining the flow, said determining the first interface screen, said rendering, said collecting, and said storing are performed by the interface module.

17. The process of claim 16, said building further comprising:

subsequent to said collecting, generating, by the business module, a transaction result by performing the business transaction with parameters of the collection of input data items; and returning the transaction result from said generating to the caller application, wherein the flow is Expense Accounting Detail (EAD) Screen Type comprising eight (8) screen subsections selected from the group consisting of: a Navigation Trail, a Screen Title, an Application Tabs, a Value Add Statement, a Document Information, a Cost Object Label, a Cost Objects, and an Other Accounting Detail, wherein the first named data group is Accounting Data Attribute Type, and wherein each screen subsection represents a respective group of one or more instances for an attribute of the Accounting Data Attribute Type.

18. The process of claim 16, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a best-fit content for the first screen subsection among contents stored in the transaction data storage pursuant to a first entity key value associated with the determined first entity, wherein the best-fit content is located by applying the data group selection criteria defined in the first data collecting rule;

determining that the first screen subsection comprises an attribute component based on the first data collecting rule, wherein the attribute component is mapped with an input data item of the first set of input data items, wherein the attribute component corresponds to an input field within the first screen subsection;

composing the first interface screen by use of the located best-fit content and the input field associated with the attribute component; and displaying the composed first interface screen such that the interface module enables the user to provide the input data item as a value of the attribute component through the input field of the first interface screen.

19. The process of claim 16, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a best-fit content for the first screen subsection pursuant to a first entity key value associated with the determined first entity, wherein the best-fit content is located by applying the data group selection criteria defined in the first data collecting rule;

determining that the first screen subsection comprises a second screen subsection, wherein the second screen subsection comprises at least one attribute component based on the first data collecting rule, wherein each attribute component of said at least one attribute component is mapped with a respective input data item of the first set of input data items, wherein each attribute component corresponds to a respective input field within the second screen subsection;

composing the first interface screen by use of the located best-fit content and all input fields associated with said at least one attribute component; and displaying the composed first interface screen such that the interface module enables the user to provide the respective input data item as a value of each attribute component through the respective input field of the first interface screen.

20. The process of claim 16, said rendering comprising:

selecting the first screen subsection of the first interface screen pursuant to the first data collecting rule;

determining the first entity that governs the first screen subsection pursuant to the first data collecting rule, wherein the first screen subsection is an instance of the first named data group as defined in the first data collecting rule, and wherein the first entity is an instance of the business data entity defined in the first data collecting rule;

locating a first display content for the first screen subsection among contents stored in the transaction data storage pursuant to a first entity key value associated with the determined first entity, wherein the first display content is located by applying the data group selection criteria defined in the first data collecting rule;

determining that the first screen subsection comprises a subsection type, wherein the subsection type comprises a second screen subsection and a second display content associated with the second subsection pursuant to the first data collecting rule, wherein the second screen subsection comprises at least one attribute component based on the first data collecting rule, wherein each attribute component of said at least one attribute component is mapped with a respective input data item of said at least one input data item, wherein each attribute component corresponds to a respective input field within the second screen subsection;

composing the first interface screen by use of the first display content, the second display content, and all input fields associated with said at least one attribute component; and displaying the composed first interface screen such that the interface module enables the user to provide the respective input data item as a value of each attribute component through the respective input field of the first interface screen.

* * * * *